WALTER G. PRESTON
INVENTOR

ATTORNEYS nited States Patent Office 3,558,189
Patented Jan. 26, 1971

3,558,189
RETRACTOR FOR SEAT BELTS
Walter G. Preston, Tulare, Calif., assignor of one-half to John T. Posey, Pasadena, Calif.
Filed Aug. 15, 1968, Ser. No. 752,954
Int. Cl. A62b 35/00; B60r 21/10
U.S. Cl. 297—388                                6 Claims

ABSTRACT OF THE DISCLOSURE

A retractor for seat belts of automotive vehicles and the like adapted to be mounted beneath the seat of such a vehicle providing a belt take-up and guiding mechanism having a portion extended between the seat and the backrest portion thereof affording a substantially frictionless path of travel for the belt during movement between its retracted and extended positions and including tension means for said belt take-up mechanism which is effective fully to retract the belt and which permits unrestricted extension of the belt while maintaining a substantially constant rate of pull throughout the full extent of belt movement between its fully retracted and fully extended positions.

BACKGROUND OF THE INVENTION

Various seat belt retracting and guiding devices which are intended to retract both the connector and buckle ends of seat belts have been employed on the seats of automotive vehicles and the like without the success desired. At least none of the prior art structures has been incorporated on such vehicles by the manufacturers. This has been primarily due to the inability of such prior structures to provide dependable retraction of both ends of the seat belts. The belt at the buckle end is, of course, required to be retracted through the constricted, relatively narrow, and nearly non-existent passage between the seat and the backrest portion of the seat. The substantial frictional drag imposed against the belt through such path of belt travel has made automatic retraction heretofore virtually impossible. If the retractor, which is usually located beneath the seat, is sufficiently strong to pull the belt through such restricted passage for automatic retraction, it is much too strong to permit the belt to be easily withdrawn from the retractor for extension to a position of use. The Society of Automotive Engineers' specifications require that the force needed to overcome the belt retraction force must not exceed a linear force of three pounds. With the conventional structures, this is not sufficient to pull the belt through the constricted passage between the seat and the backrest portion thereof. Furthermore, such prior devices usually employ an axially coiled or radially wound tension spring having a varying rate of spring force during movement between its expanded and collapsed conditions. The force rate of such a spring is, of course, lowest when aproaching a static, collapsed condition when full seat belt retraction is required. Conversely, the spring has a substantially greater force rate when fully tensioned, making the seat belt buckling operation difficult and nearly impossible for all except those of unusual strength.

SUMMARY OF THE INVENTION

Accordingly, it is an object of the present invention to provide an improved retractor for seat belts in automotive vehicles and the like.

Another object is to provide such an improved retractor which can be effectively employed on both the buckle and connector ends of such seat belts.

Another object is to provide a retractor of the character described affording dependable retraction of the seat belt but which imposes only a minimum of resistance to movement for ease of extension of the seat belt during the buckling operation.

Another object is to provide a seat belt retractor capable of guiding the seat belt through the constricted passage between the seat and the backrest portion thereof with substantially no frictional drag against the belt.

Another object is to provide a retractor for seat belts which, in view of the substantial absence of frictional drag upon the belt, insures full retraction and requires only a minimum pulling force to extend the seat belt for use and which is capable of maintaining a substantially constant force upon the belt during movement between its fully retracted and fully extended positions.

Another object is to provide a retractor for seat belts which is adapted to be mounted beneath the seat of a vehicle and which has a belt take-up mechanism utilizing a tension member of a resiliently axially stretchable material capable of continually tensioning the belt toward a retracted position and which, during extension of the belt, is automatically supplied additional material so as to preclude excessive tensioning of the material to maintain a substantially constant pulling force against the seat belt during movement between its fully retracted and fully extended positions.

Other objects and advantages of the present invention will subsequently become more clearly apparent upon reference to the following description and accompanying drawings.

DESCRIPTION OF THE PREFERRED EMBODIMENT

Figure 1:
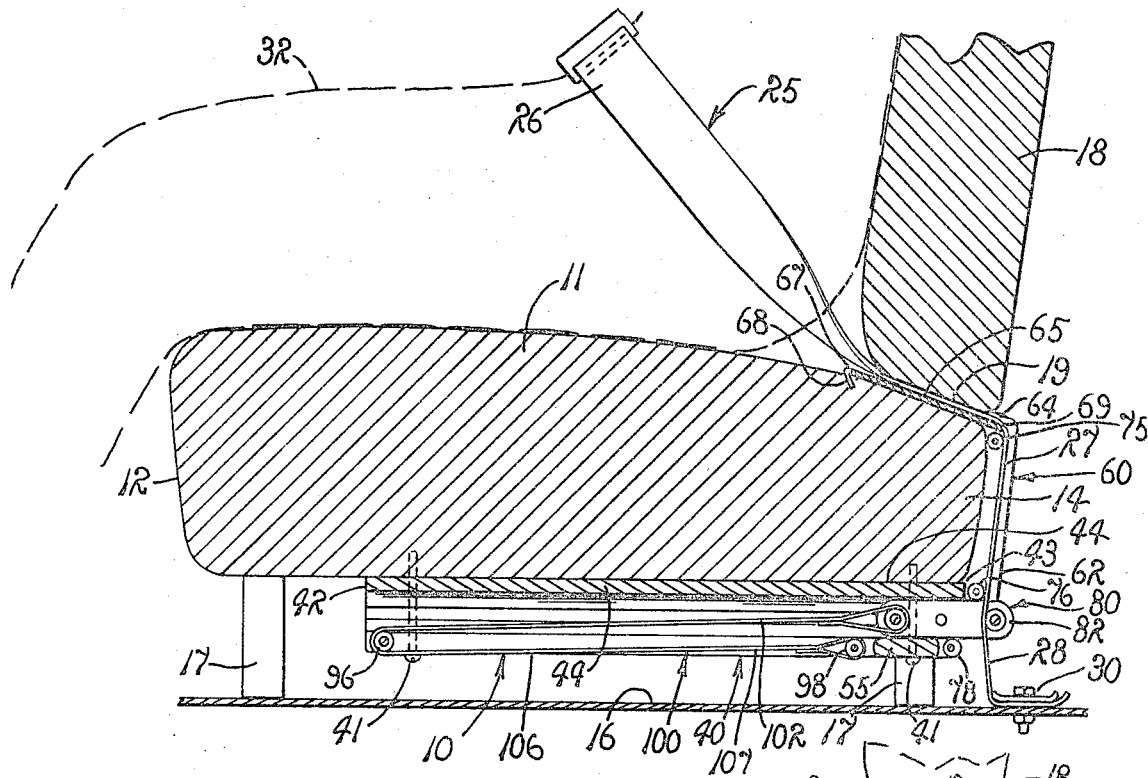
FIG. 1 is a longitudinal vertical section, taken substantially centrally through the retractor of the present invention, shown mounted beneath the seat of an automotive vehicle or the like in association with a seat belt disposed in an extended operating position.

Referring more particularly to the drawings, a retractor for seat belts within an automotive vehicle or the like is generally indicated by the reference numeral 10. The retractor is shown mounted beneath the seat 11 of such a vehicle. The seat includes predetermined opposite forward and rearward portions 12 and 14, respectively, and is supported in elevationally spaced relation to a frame-supported floor 16 of the vehicle by a plurality of seat mounting brackets or legs 17. The seat further provides a substantially upstanding backrest portion 18 upwardly extended from the rearward portion 14 thereof with a constricted passage 19 formed therebetween.

One side of a conventional seat belt 25 is shown disposed upon the seat 11 having a buckle end 26, an intermediate portion 27 extended through the passage 19 and an opposite lower connector end 28 anchored to the floor 16 of the vehicle by an anchor bracket and bolting assembly 30. As shown in FIG. 1, the seat belt is extended to an operating position disposed about the lap of a passenger indicated by the dashed lines 32. It will be apparent that the seat belt includes an opposite connector side, not shown, similarly extended through the passage 19 between the seat 11 and the backrest portion 18 thereof for connection to the floor 16 of the vehicle in a manner similar to that shown for the side 25.

The retractor 10 embodying the principles of the present invention provides an elongated channular frame or housing 40 which is mounted upon the underside of the seat 11 by a plurality of mounting screws or bolts 41. The housing includes predetermined forward and rearward ends 42 and 43, respectively disposed adjacent to the forward and rearward portions 12 and 14 of the seat 11. The housing has an upper wall 44 and depending oppositely spaced substantially parallel side walls 45. The side walls provide inwardly facing longitudinally extended lower rails 46 which define a pair of elongated guide tracks 48 longitudinally through the housing. A pair of elongated grooves 50 are individually formed in the side walls 45 of the housing within the guide tracks 48 for extension from the forward end 42 of the housing to terminate short of the rearward end 43 of the housing in closed stop engaging ends 53. A lower strut 55 is extended between the lower rails 46 closely adjacent to the rearward end of the housing for strengthening purposes.

Figure 2:
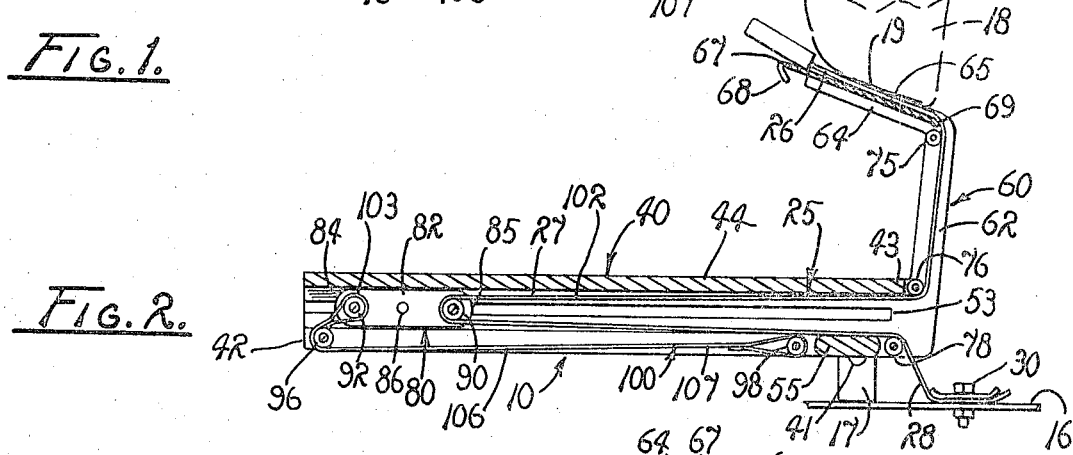
FIG. 2 is a longitudinal vertical section through the retractor similar to FIG. 1 but showing the retractor and seat belt in a retracted position.
Figure 3:
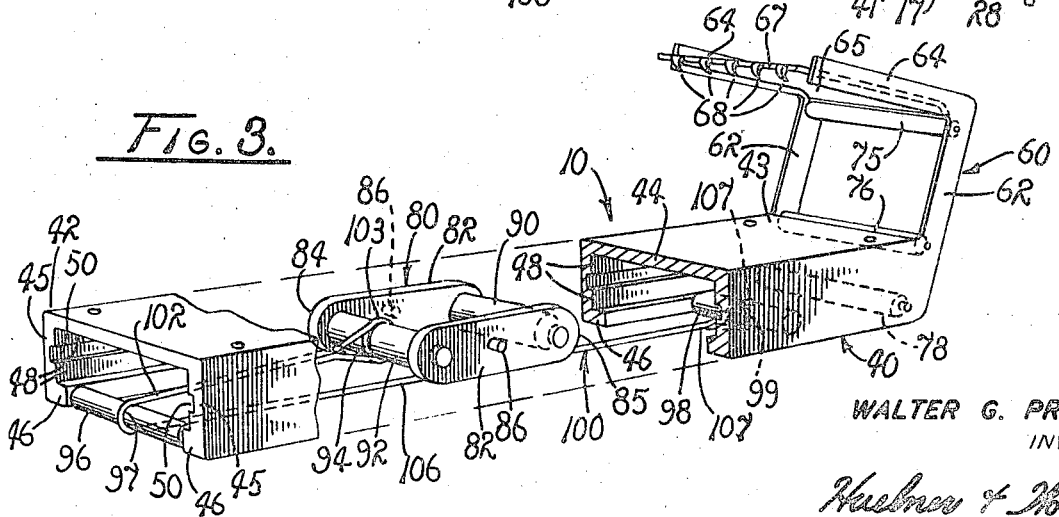
FIG. 3 is a somewhat enlarged perspective view of the retractor removed from the seat of the vehicle and the seat belt of the preceding figures with portions broken away for illustrative convenience.

A belt guiding structure 60 is disposed in upward extension from the rearward end 43 of the housing 40 for guiding the belt around the rearward portion 14 of the seat 11. The guiding structure includes a pair of upwardly extended arms 62 integral with the side walls 45 of the housing and individually upwardly extended therefrom in spaced substantially parallel relation to each other. The arms include upper forwardly extended portions 64 which, as best shown in FIG. 2, are extended through the passage 19 between the seat 11 and the backrest portion 18 thereof. A substantially flat belt slide plate of rigid sheet material is mounted between the upper portions 64 of the arms to provide a substantially frictionless slide surface for the belt. The slide plate includes a predetermined forward edge 67 which has a pair of return-bent pointed claws or fingers 68 disposed in seat-penetrating relation to preclude inadvertent rearward withdrawal of the plate and arms from the passage 19. The plate has an oppositely downwardly curving rearward edge 69 for smoothly guiding the belt downwardly around the rearward portion 14 of the seat 11.

An upper belt roller 75 is freely rotatably mounted between the upper ends of the arms 62 immediately below the rearward edge 69 of the slide plate. An intermediate roller 76 is disposed between the arms at their lower ends immediately rearwardly of the upper wall 44 of the housing 40 smoothly to guide the intermediate portion 27 of the belt into the housing. A lower roller 78 is rotatably mounted between the rails 46 at the rearward end 43 of the housing rollably to engage the portion of the belt immediately adjacent to the anchor bracket 30 when the seat belt 25 is disposed in the retracted position of FIG. 2.

A belt take-up mechanism 80 is slidably mounted within the tracks 48 of the retractor housing 40 for engagement with the intermediate portion 27 of the seat belt 25. The take-up mechanism includes a pair of elongated slide blocks 82 having predetermined forward and rearward ends 84 and 85, respectively. A pair of stop dogs 86 are individually mounted in outward extension from the slide blocks for sliding movement within the elongated grooves 50 in the guide tracks. A belt take-up roller 90 is rotatably mounted between the rearward ends 85 of the slide blocks 82 for engagement of the inner periphery thereof with the intermediate portion 27 of the belt.

A tension member anchor rod 92 is disposed in interconnecting relation between the forward ends 84 of the slide blocks 82 in spaced substantially parallel relation to the take-up roller 90. The anchor rod includes an annular notch 94 substantially intermediate the slide blocks. A tension member feed roller 96 having an annular notch 97 is rotatably mounted between the rails 46 at the forward end 42 of the housing 40 below the guide tracks 48. A stationary anchor rod 98 having an annular notch 99 is rigidly mounted in rearwardly spaced substantially parallel relation to the feed roller between the rails 46 of the housing immediately ahead of the strut 55.

An elongated belt tensioning cord 100 is disposed within the housing normally to hold the seat belt 25 in the retracted position of FIG. 2. The tension cord is constructed of a resilient axially stretchable plastic material preferably that material which is marketed under the trade name, "Lycra." Such material is able to accommodate substantial stretching without any permanent deformation and is capable of returning to a static predetermined length insuring full retraction of the seat belt. The cord has an upper force applying portion 102 providing a connector end 103 secured to the anchor rod 92 on the slide blocks 82 within the annular notch 94. The cord is trained about the notch 97 in the feed roller 96 in the housing and provides a rearwardly extended lower cord supply portion 106 having an end 107 disposed about the stationary anchor rod 98 within the groove 99.

OPERATION

The operation of the described embodiment of the subject invention is believed to be clearly apparent and is briefly summarized at this point. When the seat belt 25 is disposed in its retracted position of FIG. 2, the intermediate portion 27 of the belt is disposed within the housing 40 and is maintained in such retracted position by its engagement with the belt take-up roller 90 upon the slide blocks 82. The slide blocks and the intermediate portion of the belt are disposed closely adjacent to the forward end of the housing by virtue of pre-tensioning the cord 100 to provide a force sufficient fully to retract the seat betl and to dispose the buckle end 26 thereof against the backrest portion 18 of the seat 11 and adjacent to the forward edge 67 of the slide plate 65.

Upon the application of a minimum linear pulling force against the buckle end 26 of the seat belt 25 of approximately two pounds, the belt is axially slid along the surface of the slide plate 65 and over the freely rotatable belt rollers 75 and 76 between the arms 62 of the belt guiding structure 60. The upper portions 64 of the arms tend to space the lower portion of the backrest of the seat a slight distance from the slide plate so that such belt movement is accomplished with substantially no frictional drag. During such belt movement, the intermediate portion 27 of the belt rollably engages the take-up roller 90 between the slide blocks 82 further to reduce frictional drag which causes the slide blocks to move from left to right, as viewed in FIG. 2, through the guide tracks 48 of the housing. Such movement tensions the upper force applying portion 102 of the tension cord immediately to provide a retractive force on the slide blocks in the event the buckle end 26 of the seat belt is released.

During continued movement of the slide blocks to the right, the upper force applying portion 102 of the tension cord 100 is continually supplied an additional length of cord from the lower supply portion 106 thereof as needed to maintain such two pounds' pull by intermittent rolling engagement of the cord with the feed roller 96. Accordingly, the upper force applying portion 102 of the tension cord is never over-stretched and thus precludes the development of an excessive retractive force upon the seat belt above the predetermined limit required by the Society of Automotive Engineers' specifications.

In view of the substantial reduction in frictional drag upon the seat belt 25 rearwardly of the seat 11 by virtue of the slide plate 65 and rollers 75 and 76, the force necessary to overcome the retractive force of the tension cord 100 never exceeds two pounds which is well below the established standards. Accordingly, with the additional cord continually being supplied to the upper force-applying portion thereof, the retractive force resisting extension of the belt is maintained at a constant rate during the entire extent of travel of the slide blocks from the forward end to the rearward end of the housing.

Rearward movement of the slide blocks 82 is terminated by engagement of the stop dogs 86 with the ends 53 of the grooves 50. Upon such engagement, the rearward ends 85 of the slide blocks 82 are extended rearwardly outwardly from the rearward end 43 of the housing 40 to the position shown in FIG. 1. Full withdrawal of the slide blocks from the housing is, of course, precluded by the described engagement of the stop dogs with the ends of the grooves 50. It will be noted that, upon full extension of the seat belt 25, the intermediate portion 27 thereof is fully withdrawn from the housing in spaced relation from the lower roller 78 and is disposed in a substantially vertically extended position between the anchor bracket 30 on the floor 16 of the vehicle and the upper roller 75 beneath the slide plate 65.

Upon release of the buckle end 26 of the seat belt 25, the intermediate portion 27 thereof is immediately drawn inwardly of the housing by the slide block take-up roller 90 incident to the retractive force provided by the tension cord 100. As described, the length of the cord is predetermined so as to provide a retractive force sufficient fully to retract the seat belt into the housing and to position the buckle end 26 thereof adjacent to the backrest portion of the seat by the return of the tension cord to its original predetermined length of FIG. 2.

In view of the foregoing, it is readily apparent that the structure of the present invention provides an improved retractor for seat belts which is readily adapted for use on both the connector and buckle ends of such seat belts. The retractor of the present invention substantially reduces the frictional drag upon the belt so as effectively to lower the required pulling force which is needed fully to retract the seat belt and which permits greater ease of seat belt extension to its fully extended operating position. Furthermore, the retraction force against the seat belt is maintained at a constant minimum rate during the entire extent of travel of the belt between its fully retracted and fully extended positions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A retractor for seat belts in automotive vehicles and the like in which the vehicle has a rigid floor supporting a seat with the seat including a backrest portion rearwardly upwardly extended therefrom, comprising an elongated housing having predetermined forward and rearward ends mounted beneath such a seat; a seat belt having a buckle end disposed upon the seat, an intermediate portion extended rearwardly between the seat and said backrest portion thereof, and an opposite connector end secured to the floor of the vehicle; belt guide means upwardly extended from said rearward end of the housing providing an upwardly spaced portion forwardly extended between said seat and said backrest portion thereof affording a substantially frictionless path of travel for the belt; belt take-up means mounted within the housing slidably engaging said intermediate portion of the belt for drawing the same into the housing to urge said buckle end thereof from an extended position toward said backrest portion of the seat to a fully retracted position; and tension means having opposite ends respectively connected to said belt take-up means and to the housing normally to maintain the belt in said retracted position but permitting extension of the belt therefrom at a substantially constant rate of pull throughout the entire extent of travel from the belt, said belt guide means providing a pair of upstanding spaced substantially parallel arms integral with the housing, a first roller freely rotatably mounted between the arms adjacent to said rearward end of the housing in rolling engagement with said intermediate portion of the belt, a second belt engaging roller mounted at said rearward end of the housing below said belt take-up means, a third belt engaging roller freely rotatably mounted between the arms rearwardly adjacent to said forwardly extended portion of the arms, and a belt slide plate mounted between said forwardly extended portions of the arms cooperating with the rollers along said path of belt travel to provide substantially frictionless movement of the belt rearwardly around the seat and through said housing.

2. The retractor of claim 1 in which said forwardly extended portions of the arms include a pair of return bent pointed fingers engageable with the seat in penetrating relation to preclude inadvertent withdrawal of the arms from between the seat and the backrest portion thereof.

3. The retractor of claim 2 wherein said housing provides a pair of elongated longitudinally extended tracks between said forward and rearward ends, said take-up means comprises a pair of elongated slide blocks disposed for sliding movement within the tracks and providing opposite forward and rearward ends respectively related to said corresponding ends of the housing, a traveling anchor rod interconnecting said forward ends of the blocks providing a connection for one end of said tension means, a roller rotatably mounted between said rearward ends of the slide blocks providing an inner periphery rollably engaging the intermediate portion of the belt, a stationary anchor rod mounted on the housing beneath said tracks and adjacent to said rearward end of the housing providing a connection for the opposite end of the tension means, and a tension means feed roller rotatably mounted at the forward end of the housing below the tracks over which the tension member is trained in direction-reversing relation between its ends providing a retractive force upon the belt.

4. The retractor of claim 3 in which said tension means is an elongated cord of resiliently axially stretchable material having a lower supply portion extended between its end connected to the stationary anchor on the housing and the feed roller, and an upper force applying portion between the feed roller and the traveling anchor on the slide blocks so that during movement of the slide blocks toward said rearward end of the housing incident to extension of the seat belt the upper force applying portion is continually fed additional cord from the lower supply portion to maintain substantially the same pull upon the belt during the entire extent of travel of the slide blocks within the housing.

5. A retractor for seat belts in automotive vehicles and the like in which the vehicle has a rigid floor supporting at least one seat with the seat including a backrest portion rearwardly upwardly extended therefrom, comprising an elongated channular belt retractor and guide housing mounted beneath such a seat providing oppositely spaced predetermined forward and rearward ends; a pair of belt guide arms upwardly extended from said rearward end of the housing in laterally spaced substantially parallel relation and including elevationally spaced forwardly extended portions disposed between said seat and said backrest portion thereof and including a pair of return bent pointed fingers engageable with the seat in penetrating relation to preclude inadvertent withdrawal of the arms from between the seat and the backrest portion thereof; a pair of elongated tracks disposed within the housing and longitudinally extended between their opposite forward and rearward ends; a seat belt having a buckle end on the seat, an intermediate portion, and an opposite connector end fastened to the floor of the vehicle rearwardly of the seat; a pair of elongated slide blocks disposed for sliding movement within the tracks and providing oppositely forward and rearward ends respectively related to said corresponding ends of the housing; a belt take-up roller rotatably mounted between said rearward ends of the slide blocks having an inner peripheral portion rollably engaging said intermediate portion of the belt for retracting the belt into the housing during movement of the slide blocks within the track toward said forward end of the housing; means mounted at said rearward end of the housing and between said upstanding arms thereof providing substantially frictionless movement of the belt between its retracted and extended positions; a traveling anchor interconnecting said forward ends of the slide blocks; a stationary anchor on the housing adjacent to its rearward end; a tension member feed roller rotatably mounted at said forward end of the housing below said tracks; an elongated tension cord of resiliently axially stretchable material having an upper force applying portion providing an end connected to said traveling anchor on the slide blocks and forwardly extended therefrom and trained about said feed roller for reverse rearward extension toward the rearward end of the housing, said cord including a lower supply portion having a lower connector end fastened to said stationary anchor; and stop means within the tracks in the housing engageable with said slide blocks to preclude complete withdrawal of the slide blocks from the rearward end of the housing and to locate said take-up roller substantially directly above said connection of the connector end of the seat on the floor of the vehicle for disposing the belt in a substantially vertical fully extended position completely removed from the housing.

6. The retractor of claim 5 including a pair of elongated longitudinally extended grooves individually disposed within said tracks within the housing and providing stop ends spaced from said rearward end of the housing, and a pair of opposed stop dogs on said slide blocks individually slidably receivable within said grooves and engageable with said stop ends thereof to preclude complete removal of the slide blocks from the rearward end of the housing.

References Cited

UNITED STATES PATENTS 3,107,121  10/1963  Mougey _____ 297—388

FOREIGN PATENTS 883,703  12/1961  Great Britain _____ 297—388

KENNETH DOWNEY, Primary Examiner

U.S. Cl. X.R.

280—150